Patented Nov. 4, 1947

2,430,424

UNITED STATES PATENT OFFICE 2,430,424

PLASTIC COMPOSITIONS CONTAINING A FATTY ACID ESTER OF STYRENE GLYCOL

Carroll A. Hochwalt and Charles A. Thomas, Dayton, Ohio, assignors to Monsanto Chemical Company, a corporation of Delaware No Drawing. Application November 23, 1942, Serial No. 466,685

7 Claims. (Cl. 106—180)

The present invention relates to a series of derivatives of wide utility as plasticizing and softening agents for plastic compositions and synthetic resins. It relates particularly to esters of styrene glycol.

It is an object of the invention to provide organic plastic compositions of especial value for use in the arts. It is a further object to provide improved plastic compositions containing cellulose esters, ethers and synthetic resins, particularly those produced by condensation of aldehydes with partially hydrolyzed polymerization products of vinyl esters. The plastic compositions are characterized not only by a high degree of flexibility, but also improved stability to heat and daylight.

According to the present invention there are employed as plasticizing agents diesters of styrene glycol having the following general formula:

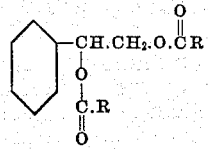

where R is an aliphatic hydrocarbon radical of from 1 to 28 carbon atoms. Typical members of this class include styrene glycol diacetate, styrene glycol dibutyrate, styrene glycol dipropionate, styrene glycol dicaproate and styrene glycol dilaurate, etc. These compounds are mentioned merely for illustrative purposes, since others within the class defined in this invention are equally satisfactory plasticizers.

The esters used in the present invention, some of which are new chemical compounds are not claimed in the present application but constitute the subject matter of the copending application of Carroll A. Hochwalt and Charles A. Thomas, Serial No. 466,686, filed November 23, 1942, are colorless or very pale yellow viscous liquids or vary from waxy to crystalline solids. They are all high boiling compounds, many of them not boiling at all at atmospheric pressure without decomposition, and their plasticizing effect is extremely high due to their excellent solvent powers or miscibility with the components of the plastic compositions or lacquers with which they are used. The styrene glycol diesters are compatible, for example, with cellulose esters, cellulose ethers and the polyvinyl resins such as polystyrene, polyvinyl butyral, polyvinyl acetate, etc., the inclusion of the diesters in such plastic compositions and synthetic resins imparting great flexibility to such products. In particular, the styrene glycol diesters are distinguished by low vapor pressure and therefore yield artificial compositions very stable to aging, which compositions undergo substantially no loss in weight upon storage even at elevated temperatures. Artificial compositions which have been plasticized by the styrene glycol diesters are to a great extent stable to cold and retain their extensibility and their good mechanical properties even at comparatively low temperatures. Many of the present esters are substantially odorless and practically tasteless; they do not promote heat disintegration; and they cause no discoloration during exposure to sunlight.

Example 1

Styrene glycol diacetate may be employed as a plasticizer for the polyvinyl acetal type of resin known to the trade at Butvar, which resin finds extensive commercial application as an interleaving sheet in the manufacture of laminated safety glass. To 100 parts of a Butvar resin are added 30 parts of styrene glycol diacetate and the mass is then kneaded at about 150° C. until thorough incorporation results. It is then pressed out in sheets, either by means of hot rolls or by pressing between two smooth surfaces. The resulting film is clear, transparent, brilliant and possesses a remarkable degree of flexibility and toughness. Tests of the film strength at 0° F. show that when the film is supported on four sides, it is not punctured by a 1 kg. weight falling 3 feet, which results show good retention of toughness at low temperatures. The adhesion of the film to glass is good at 0° F. and at 70° F., indicating no change in adhesive properties consequent to the incorporation of the plasticizer. The film is not discolored by prolonged exposure to daylight.

Example 2

Prepare a 10% solution of "Butvar" in dioxane and then add a quantity of styrene glycol dipropionate equal to 33% by weight of the "Butvar" employed. Films cast from this solution are clear and hard and show substantial resistance to daylight.

Example 3

Proceed as in Example 1, except that instead of styrene glycol dipropionate, styrene glycol dibutyrate is employed. In this manner there is obtained a film which is clear and hard and shows great resistance to heat. The film is substantially unaffected by daylight.

Example 4

Prepare a 10% solution of "Formvar" (polyvinyl formal) in dioxane and then add a quantity of styrene glycol dibutyrate equal to 33% by weight of the "Formvar" employed. Films cast from this solution are clear, hard products which show a remarkable stability to heat.

Example 5

A solution of cellulose acetate was prepared by dissolving 20 g. of the acetate into a mixture consisting of 35 g. of diacetone alcohol, 30 g. of methyl ethyl ketone, 35 g. of acetone, 80 g. of ethyl acetate and 20 g. of xylene. To this solution there was added styrene glycol diacetate in an amount equal to two-thirds of the cellulose acetate present (total solid content of the solution being 34% styrene glycol diacetate and 66% cellulose acetate). Films cast from this solution were clear, hard and elastic and retained their elasticity upon inspection at the end of 24 hours. Heating for 75 minutes at a temperature of 100° C. does not affect the clarity or the elasticity of the films and when exposed to the rays of a General Electric sun-lamp for 14 hours there is no yellowing or checking. The flexibility of the films is retained at low temperatures.

Example 6

A solution of Tornesit (a chlorinated rubber) was prepared by dissolving 20 g. of the same in 20 g. of xylene. To this solution there was added styrene glycol diacetate in an amount equal to 25% of the Tornesit (total solid content of the solution being 22% of styrene glycol diacetate and 88% of Tornesit). Films cast from this solution were clear and elastic and showed good resistance to heat.

"Butvar" is the name of a resinous material produced by condensing butyraldehyde with a partially hydrolyzed polyvinyl acetate. The commercial product may contain approximately 19% of OH, 1% acetate and 80% of butyraldehyde groups.

"Formvar" is a material of similar properties produced by condensing formaldehyde with a similar partially hydrolyzed polyvinyl acetate. It may contain 14% polyvinyl acetate, 5% polyvinyl alcohol and 81% formal groups.

The plasticizers herein disclosed are likewise applicable to the treatment of such varied synthetic resins as those derived from styrene, vinyl esters, vinyl ethers, other vinyl resins, natural and synthetic resins such as polybasic acid-polyhydric alcohol resins, phenol formaldehyde resins, damar, shellac and the like. The styrene glycol diesters may be used alone or in admixture with other plasticizers in the formulation of coating and plastic compositions.

What we claim is:

1. A plastic product comprising a resinous material produced by condensing butyraldehyde with a partially hydrolyzed polyvinyl acetate, said product containing a diester of styrene glycol.
2. A polyvinyl acetal plastic composition containing styrene glycol dipropionate.
3. A plastic product comprising a resin produced by condensing butyraldehyde with a partially hydrolyzed polyvinyl acetate, said product containing styrene glycol dipropionate.
4. A composition of matter comprising a cellulosic ester plasticized with a fatty acid ester of styrene glycol.
5. A composition of matter comprising cellulose acetate plasticized with a fatty acid ester of styrene glycol.
6. A plasticized composition comprising a plasticizable organic substance and as a plasticizer therefor styrene glycol diacetate.
7. A plasticized composition comprising a plasticizable organic substance and as a plasticizer therefor a fatty acid ester of styrene glycol.

CARROLL A. HOCHWALT.
CHARLES A. THOMAS.

REFERENCES CITED

The following references are of record in the file of this patent:

UNITED STATES PATENTS

| Number | Name | Date |
| --- | --- | --- |
| 2,182,361 | Smith | Dec. 5, 1939 |
| 2,139,369 | Kyrides | Dec. 6, 1938 |
| 2,305,827 | Kampfer | Dec. 22, 1942 |
| 2,315,557 | Soday | Apr. 6, 1943 |

OTHER REFERENCES

Dauben et al., Journ. Amer. Chemical Society, vol. 63, pages 1883–1885 (1941), as abstracted by Chemical Abstracts, vol. 35 (1941), page 5873. (Copy in Scientific Library.)